(12) United States Patent
Tong et al.

(10) Patent No.: US 12,536,281 B1
(45) Date of Patent: Jan. 27, 2026

(54) SYSTEMS AND METHODS FOR MALWARE DETECTION IN PORTABLE EXECUTABLE FILES

(71) Applicant: Morgan Stanley Services Group Inc., New York, NY (US)

(72) Inventors: Chenggang Tong, Singapore (SG); Fan Liu, Singapore (SG); Yingfei Wang, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/227,656

(22) Filed: Jun. 4, 2025

(51) Int. Cl.
*G06F 21/56* (2013.01)
(52) U.S. Cl.
CPC ........ *G06F 21/56* (2013.01); *G06F 2221/034* (2013.01)
(58) Field of Classification Search
None
See application file for complete search history.

(56) References Cited

U.S. PATENT DOCUMENTS

| | | | |
|---|---|---|---|
| 6,971,019 B1 * | 11/2005 | Nachenberg | G06F 21/566 713/188 |
| 7,370,360 B2 * | 5/2008 | van der Made | G06F 21/563 714/38.14 |
| 8,881,293 B1 * | 11/2014 | Brucker | G06F 8/75 717/136 |
| 9,213,838 B2 | 12/2015 | Lu | |
| 9,454,659 B1 * | 9/2016 | Daymont | G06F 21/566 |
| 9,594,904 B1 | 3/2017 | Jain | |
| 9,792,443 B1 * | 10/2017 | Sheridan | G06F 21/563 |
| 9,870,471 B2 | 1/2018 | Shen et al. | |
| 10,007,789 B2 | 6/2018 | Kim et al. | |
| 10,033,747 B1 | 7/2018 | Paithane et al. | |
| 10,083,298 B1 * | 9/2018 | Krishnappa | G06F 21/563 |
| 10,354,069 B2 * | 7/2019 | Gray | G06F 11/3636 |

(Continued)

FOREIGN PATENT DOCUMENTS

| | | |
|---|---|---|
| CN | 107908963 | 4/2018 |
| CN | 109543410 | 3/2019 |

(Continued)

OTHER PUBLICATIONS

Mei Rui, Yan Han-Bing, Shen Yuan, Han Zhi-Hui. Application Research of Slicing Technology of Binary Executables in Malware Detection. Journal of Cyber Security. vol. 6 No. 3. May 2021.

(Continued)

*Primary Examiner* — Christopher C Harris
(74) *Attorney, Agent, or Firm* — PEARL COHEN ZEDEK LATZER BARATZ LLP (57) ABSTRACT

Systems and methods for detecting malware in portable executable (PE) files is provided. A PE file can be received by a server, the PE file can be decompiled into p-code, and one or more predetermined variables can be extracted from the p-code, where the one or more predetermined variables are potentially malicious. The one or more predetermined variables can be backward to its respective source and constant values found in the one or more predetermined variables can be extracted. The constant values can indicate the PE file as malware and preventing the PE file from being executed.

12 Claims, 4 Drawing Sheets

(56) References Cited

U.S. PATENT DOCUMENTS

| | | | |
|---|---|---|---|
| 10,416,970 | B2 | 9/2019 | Takata et al. |
| 11,354,409 | B1 | 6/2022 | Kenefick |
| 12,050,687 | B1 | 7/2024 | Tong et al. |
| 2008/0263669 | A1 | 10/2008 | Alme |
| 2009/0254992 | A1* | 10/2009 | Schultz .............. G06F 21/562 726/24 |
| 2012/0317644 | A1 | 12/2012 | Kumar et al. |
| 2013/0185798 | A1* | 7/2013 | Saunders .............. G06F 8/53 726/22 |
| 2016/0057159 | A1 | 2/2016 | Yin |
| 2019/0114417 | A1 | 4/2019 | Subbarayan |
| 2019/0129825 | A1* | 5/2019 | Bardin .............. G06F 21/563 |
| 2019/0220596 | A1* | 7/2019 | Lie .............. G06F 18/24 |
| 2020/0250015 | A1 | 8/2020 | Zhi |
| 2021/0141897 | A1 | 5/2021 | Seifert et al. |
| 2021/0374241 | A1 | 12/2021 | Parikh et al. |
| 2022/0083661 | A1 | 3/2022 | Ma et al. |
| 2022/0129564 | A1 | 4/2022 | Hecht |
| 2022/0300615 | A1* | 9/2022 | Sahu .............. G06F 21/577 |
| 2023/0367516 | A1 | 11/2023 | Zhang |
| 2024/0007492 | A1 | 1/2024 | Shen |
| 2025/0077201 | A1* | 3/2025 | Ring .............. G06F 8/53 |
| 2025/0117479 | A1* | 4/2025 | Yang .............. G06F 40/00 |

FOREIGN PATENT DOCUMENTS

| | | |
|---|---|---|
| EP | 1706833 | 10/2006 |
| WO | WO2006006144 | 1/2006 |

OTHER PUBLICATIONS

Wenjie Guo, Jingfeng Xue, Wenheng Meng, Weijie Han, Zishu Liu, Yong Wang, Zhongjun Li. MalOSDF: An Opcode Slice-Based Malware Detection Framework Using Active and Ensemble Learning. Electronics 2024, 13, 359.

Igor Santos, Felix Brezo, Xabier Ugarte-Pedrero, Pablo G. Bringas. Opcode sequences as representation of executables for data-mining-based unknown malware detection. Information Sciences 231 (2013) 64-82.

Yulei Sui, Jingling Xue. SVF: Interprocedural Static Value-Flow Analysis in LLVM.

Saurabh Sinha, Mary Jean Harrold, Gregg Rothermel. System-Dependence-Graph-Based Slicing of Programs with Arbitrary Interprocedural Control Flow.

Chen et al., Malware Classification Using Static Disassembly and Machine Learning, arXiv:2201.07649v1, [cs.CR] dated Dec. 10, 2021, 9 pages.

* cited by examiner

SYSTEMS AND METHODS FOR MALWARE DETECTION IN PORTABLE EXECUTABLE FILES

FIELD OF THE INVENTION

The invention relates generally to systems and methods for malware detection in portable executable (PE) files. In particular, to systems and method for malware detection with PE file variable source analysis based on backward program slicing with P-code emulation.

BACKGROUND

In current cyber landscape, Endpoint Detection and Response (EDR) solutions and anti-virus engines can observe tons of unknown PE files every day. Trusted or unknown third-party vendor applications that can be particular to Windows platform can also introduce potential cyber risk.

Currently each PE file is manually analyzed to verify whether or not it contains malicious activities after alerts by detection engines and/or requested by regulations. Analyzing each PE file can require deep technical expertise and/or be time consuming. For systems that receive thousands of PE files, it is unrealistic to manually analyze the PE files for malware.

SUMMARY OF THE INVENTION

One advantage of the invention can be an ability to automatically determine whether malicious behaviors exist in received PE files. Other advantages of the invention can include a higher accuracy than traditional simple signatures (e.g., like string matching and/or regex matching) and/or fewer resources can be needed than sandbox analysis and/or machine learning methods.

In one aspect, the invention can involve a method for detecting malware in portable executable (PE) files. The method can involve receiving, by a server, a PE file and decompiling, by the server, the PE file into p-code. The method can involve extracting, by the server, one or more predetermined variables from the p-code, wherein the one or more predetermined variables are potentially malicious. The method can involve tracking, by the server, the one or more predetermined variables backward to its respective source. The method can involve extracting, by the server, constant values found in the one or more predetermined variables. The method can involve determining, by the server, whether the constant values indicate the PE file as malware, and preventing, by the server, the PE file from being executed.

In some embodiments, the method also involves locating one or more API calls in the decompiled PE file, and wherein extracting the one or more predetermined variables is based on an API definition database. In some embodiments, tracking the one or more predetermined variables backward further comprises creating a data flow of all points reached during the backward tracking.

In some embodiments, the method also involves parsing, by the server, the PE file to filter known malware. In some embodiments, tracking backward is based on an input type of the p-code.

In another aspect, the invention includes one or more non-transitory computer-readable storage media comprising instructions that are executable to cause one or more processors to receive a PE file and decompile the PE file into p-code. The instructions that are also executable to cause one or more processors to extract one or more predetermined variables from the p-code, wherein the one or more predetermined variables are potentially malicious. The instructions that are also executable to cause one or more processors to track the one or more predetermined variables backward to its respective source and extract constant values found in the one or more predetermined variables. The instructions that are also executable to cause one or more processors to determine, whether the constant values indicate the PE file as malware, and prevent the PE file from being executed.

In some embodiments, the one or more processors are further configured to locate one or more API calls in the decompiled PE file, and wherein extracting the one or more predetermined variables is based on an API definition database. In some embodiments, the tracking further causes the one or more processors to create a data flow of all points reached during the backward tracking.

In some embodiments, the one or more processors are further configured to parse the PE file to filter known malware. In some embodiments, the tracking backward is based on an input type of the p-code.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
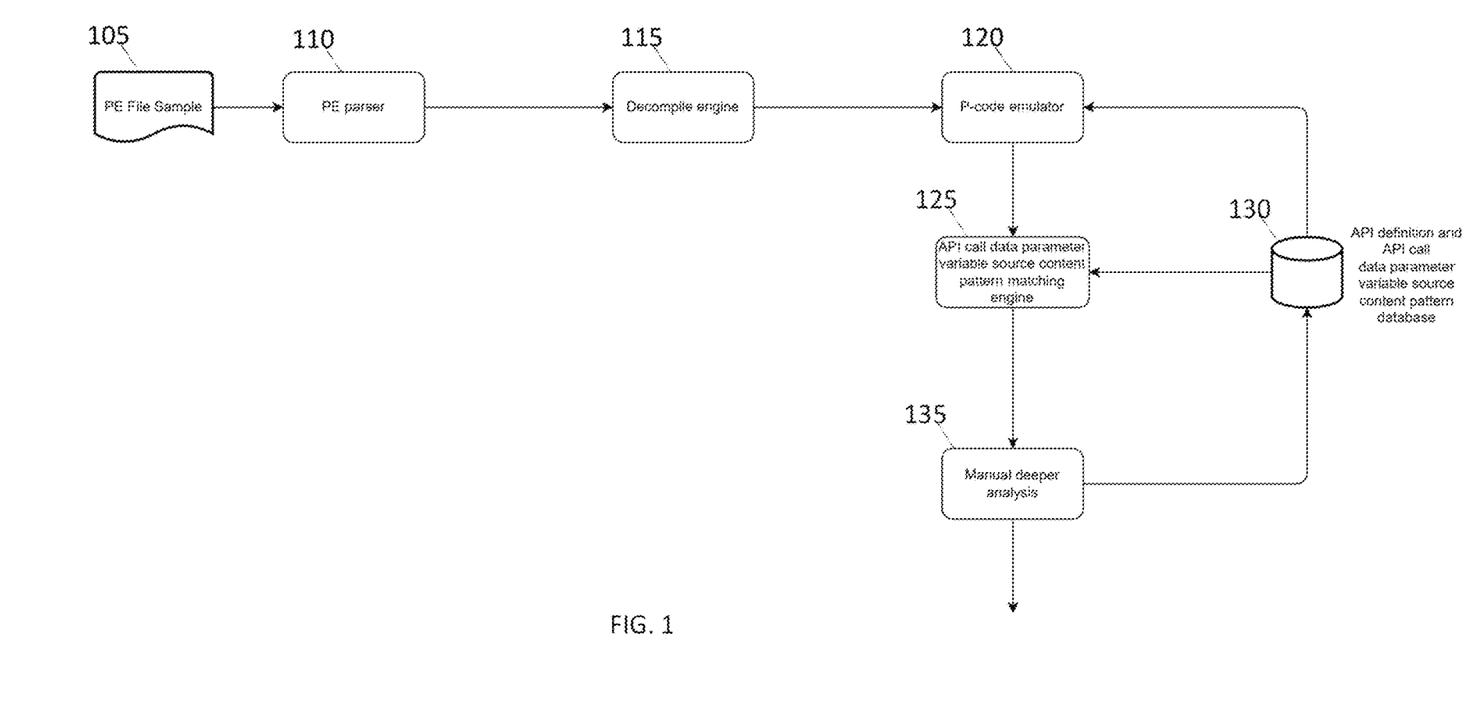
FIG. 1 is a system architecture diagram of a system for detecting malware in portable executable (PE) files, according to some embodiments of the invention.

FIG. 1 is a system architecture diagram of a system for detecting malware in portable executable (PE) files, according to some embodiments of the invention.

The system architecture can include a PE parser 110, a decompile engine 115, a P-code emulator 120, an API call data parameter variable source content pattern matching engine 125 and an API definition and API call data parameter variable source content pattern database 130. The API data parameters can include a type of API parameter containing potential malicious content. The potential malicious content contained in data parameters can be used or executed in the succeeding code. For example, a fifth parameter "*pbData" of an API CryptDecrypt API call sequence, encrypted shellcode can be sent to the API for decryption and called later.

The PE parser 110 can parse received PE files 105, for example, from daily alerts generated by cybersecurity monitoring devices and/or services, and/or from vendors who provide software to support daily businesses. The PE parser 110 can filter out known malware from PE files 105 to focus analysis of the PE files on the malware without known signatures. The PE parser 110 can communicate with the decompile engine 115.

The decompile engine 115 can receive the filtered PE files from the PE parser 110. The decompile engine 115 can decompile the PE file into assembly code and pseudo code (e.g., P-code) for emulation. The decompile engine 115 can decompile based on existing assembly language from various CPU platforms. The decompile engine 115 can communicate with the PE parser 110 and the P-code emulator 120.

The P-code emulator 120 can receive the decompiled filtered PE files, e.g., the assembly code and/or P-code from the decompile engine 115. The P-code emulator 120 can process the assembly code and the P-code to extract API call sequences and source contents of the corresponding data parameter variables. In some embodiments, the input is API name hash patterns, the P-code emulator 120 can be extracted. The API name hash can be generated by algorithms which transfer API name strings into 4 bytes integer. The P-code emulator 120 can communicate with the decompile engine 115 and the API call sequence pattern matching engine 125.

The API call data parameter variable source content pattern matching engine 125 can receive the extracted API call sequences and the source contents of the corresponding data parameter variables from the P-code emulator. The API call data parameter variable source content pattern matching engine 125 can match the extracted API call sequences and the source contents of the corresponding data parameter variables against the API call sequence patterns and the API call data parameter variable source content patterns stored in the API definition and API call data parameter variable source content pattern database 130. The API definition and API call data parameter variable source content pattern database 130 can store API call sequences and/or API name hash patterns, and API call data parameter variable source content patterns that are known.

The PE parser 110, the decompile engine 115, the P-code emulator 120 and/or the API call data parameter variable source content pattern matching engine 125 can each be on their own server (e.g., computing device), on the same server, or any combination of servers.

In some embodiments, the P-code emulator 120 recognizes API call sequences and the source contents of the corresponding data parameter variables that are Window Crypto API decrypting sequence.

The API call sequence patterns that are stored in the API definition and API call data parameter variable source content pattern database 130 can include an API name, API parameters, highlighted API context parameters and/or API data parameters.

The API call sequence patterns that are stored in the API definition and API call data parameter variable source content pattern database 130 can include pre-requisite API names and succeeding API names. The pre-requisite API names and succeeding API names can include APIs which generate, update, and/or use context parameters before and/or after a certain API to be focused on. For example, the pre-requisite API names of "CryptDecrypt" are CryptAcquireContext, CryptImportKey, CryptCreateHash, CryptHashData, CryptDeriveKey, the succeeding API names of "CryptDecrypt" are CryptDestroyHash, CryptDestroyKey, CryptReleaseContext.

The API call sequence patterns that are stored in the API definition and API call data parameter variable source content pattern database 130 can include API name hash patterns which are generated by known API name hash algorithms. For example, API name CryptDecrypt is hashed into 0x59202584 by ROR13 algorithm.

The API call sequence patterns that are stored in the API definition and API call data parameter variable source content pattern database 130 can include an API name list which is sorted in sequences by the definition of operation system SDK and generalized common malicious utilization.

Each time a new API call sequence pattern or a new pattern on source contents of the API call corresponding data parameter variables is identified, the database can be updated.

When the API call sequence pattern or a pattern on source contents of the API call corresponding data parameter variables is not matched, a manual analysis 135 can be performed. Upon performing the manual analysis 135, the identified API call sequence pattern or a pattern on source contents of the API call corresponding data parameter variables can be added into the API definition and API call data parameter variable source content pattern database 130.

Figure 2:
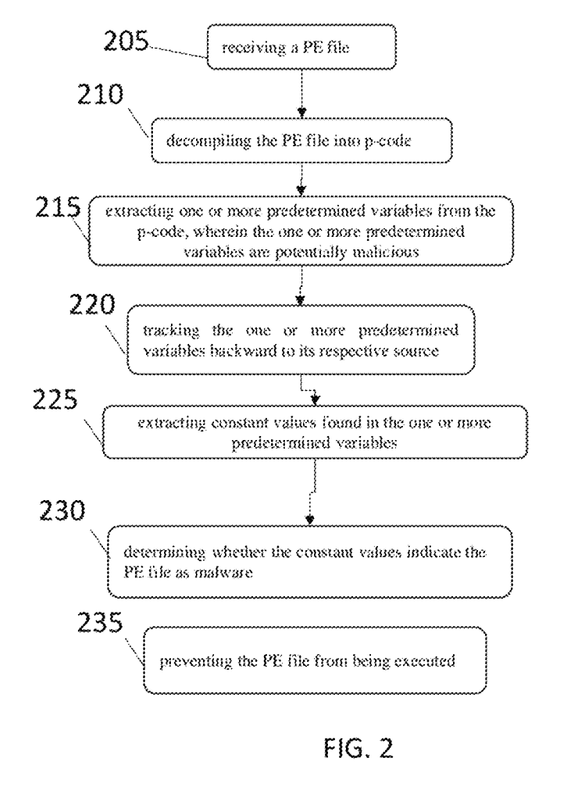
FIG. 2 is a flow diagram of a method for detecting malware in portable executable (PE) files, according to some embodiments of the invention.

FIG. 2 is a flow diagram of a method for detecting malware in portable executable (PE) files, according to some embodiments of the invention.

The method can involve receiving (e.g., by a PE parser 110, as described above in FIG. 1) a PE file (Step 205).

The method can involve decompiling (e.g., by the decompile engine 115, as described above in FIG. 1) the filtered PE file into pseudocode (e.g., P-code) and assembly code (Step 210). In some embodiments, a decompile engine can be used. For example, IDA pro, Ghidra, and/or any tool as is known in the art.

The method can involve extracting (e.g., by the P-code emulator 120, as described above in FIG. 1) one or more predetermined variables from P-code, wherein the one or more predetermined variables are potentially malicious (Step 215). The one or more predetermined variables can be determined based on a configuration file and/or any structure/data that indicates a relationship between the API calls and the predetermined variables. For example, the configuration file can indicate which one or more predetermined variables to analyze. The configuration file can be input by a user.

In some embodiments, for a PE file that includes an API call, the method can involve extracting the API call sequences from the P-code, to then extract the one or more variables from the extracted API call sequences. Extracting the API call sequences from the P-code can be done as shown in U.S. Pat. No. 12,050,687, incorporated herein by reference in its entirety.

The method can involve tracking the one or more predetermined variables backwards to its respective source (Step 220). The backward tracking can be done as shown below in FIG. 3.

The method can involve extracting constant values found in the one or more predetermined variables (Step 225). For example, the one or more predetermined variable can be a fifth parameter "*pbData" of an API CryptDecrypt that is associated with an encrypted shellcode, the encrypted shellcode can be stored in a location within a PE file and the encrypted shellcode can be loaded to the fifth parameter "*pbData" of an API CryptDecrypt when a process instance of a PE file runs.

The method can involve determining whether the constant values indicate the PE file as malware (Step 230). In some embodiments, determining whether the constant values indicate the PE file as malware involves for extracted API call sequences constant values can indicate a type of the behavior processed. For example, an API VirtualProtect, if it's new memory protect flag set to 0x10, 0x20, 0x40 or 0x80, can indicate a memory block is changed to executable, which can be a red flag of malicious activity.

In some embodiments, determining whether the constant values indicate the PE file as malware involves for a constant value of a string, a number or some other contents within the binary, matching the value with known intelligence data. For example, a ransomware may contain a particular string in it as "WannaCry", any PE files containing this string might be malicious. So this string "WannaCry" is an IOC, indicator of compromise.

The method can involve preventing the PE file from being executed (Step 235). For example, a system can put PE files to be analyzed in an isolated storage. The PE files can be analyzed according to the method above, and if they are not identified as malware they can be put into benign storage for production. For a PE file that is identified as malicious they can be moved to a quarantine place. In some embodiments, the system can include a classifier to a file storage, move PE file that is identified as malicious to a quarantine location and move PE files that are identified as benign to benign storage.

A malicious verdict can be sent to a ticketing system that is monitored by a Security Operation Center team for following up or potential incident response actions.

Figure 3:
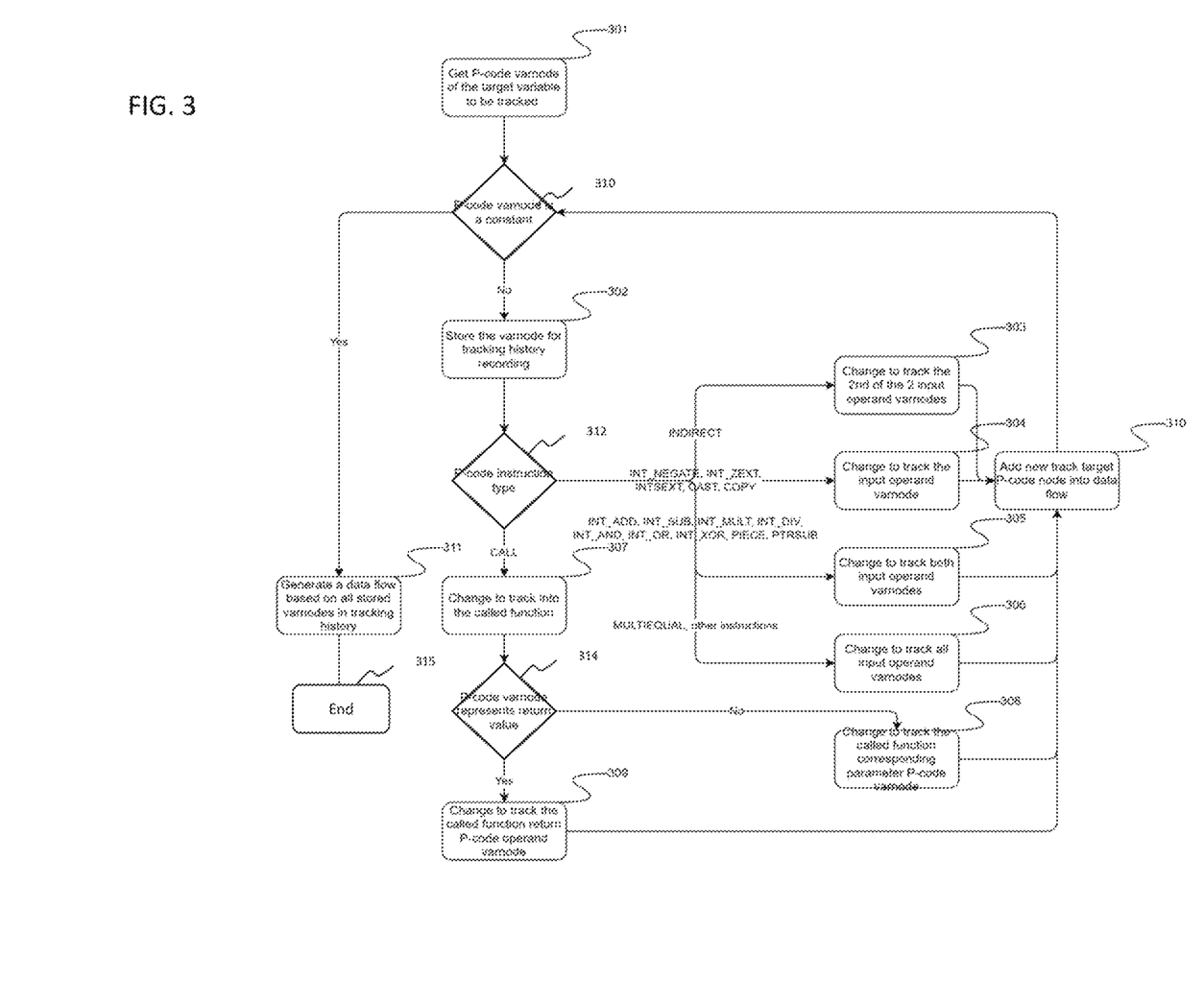
FIG. 3 is a flow chart for tracking a predetermined variable backwards to its respective source, according to some embodiments of the invention.

FIG. 3 is a flow chart for tracking a predetermined variable backwards to its respective source (e.g., by P-code emulator 120 as shown above in FIG. 1), according to some embodiments of the invention. With API calls located and/or the data parameters identified, as described above with respect to FIG. 2, the method can obtain P-code varnodes of the variables from the decompiled PE file.

The method can involve obtaining a P-code varnode of the predetermined variable to be tracked (Step 301).

The method can involve determining whether the P-code varnode is a constant (Step 310). If the P-code varnode is a constant, then the method can involve generating a data flow based on all stored varnodes in the tracking history (Step 311), and the method can end (Step 315). If the P-code varnode is constant, this can indicate that the particular variable is not dependent upon another variable or a function, and thus the backward tracking has tracked back to the source of the variable.

If the P-code varnode is not constant (e.g., points to another variable), then this can indicate that the particular variable is dependent upon another variable or a function, and thus backward tracking has not yet reached the source of the variable. If the P-code varnode is not constant then the method can involve storing the particular P-code varnode for tracking history recording (Step 302). For example, assume a piece of code: "A=B; C=A; and D=C", can be executed from the left to the right in time sequence. Also assume, D is the variable. In order to determine where the variable D is from, it can be seen in the example code, D is from C, however, data in C is from A, and the data in A is from B. Thus, in this example, tracking backward leads to B.

The method can involve determining an instruction type for the P-code (Step 312).

If the P-code instruction type (Step 312) is a "CALL", the method can involve tracking into the called function that is the input operand varnode (Step 307). For example, a piece of code can be "x=f( ); api(x);", assume x is the data parameter, and API call "api(x)". The API call "api(x)" can be tracked back to find the source of x, to "f( )", since x is assigned by "f( )" before the "api(x)".

The method can also involve determining whether a P-code varnode represents a return value (Step 314). If the P-code varnode does represent a return value, the method can also involve changing to tracking the called function "f( )" "RETURN" P-code operand varnode (Step 309). Continuing with the example, after entering "f( )" at the P-code level, the "RETURN" instruction to track backward about which variable has assigned data to x can be found. Track into the called function "f( )" which returns P-code instruction operand varnode.

Track into the called function "f( )" which returns P-code instruction operand varnode. Or in another circumstance that a piece of code can be "f(&x); api(x);". The API call "api(x)" can be tracked back to find the source of x, to "f(&x)", since x may be assigned by "f(&x)" before the "api(x)".

If the P-code varnode does not represent a return value, then the method can involve changing to track the called function corresponding to the P-code varnode (Step 308). Continuing with the above example, tracking the called function "f(&x)" the last P-code operand varnode contains x as the output varnode, after entering "f(&x)" at the P-code level, then continue in the flow chat to track back in function "f(&x)".

If the P-code instruction type (Step 312) is "INDIRECT", then the method can involve moving to the second of the two inputs operand varnodes (Step 303). For example, assume the "INDIRECT" instruction has 2 inputs and 1 output, then, "Output=Input1, Input2". Moving can cause the method to change from tracking the variable in the Output position to the Input2 position.

If the P-code instruction type is one of "INT_NEGATE, INT_ZEXT, INTSEXT, CAST, COPY", then the method can involve moving to track the input operand varnode (Step 304).

If the P-code instruction type (Step 312) is one of "INT_ADD, INT_SUB, INT_MULT, INT_DIV, INT_AND, INT_OR, INT_XOR, PIECE, PTRSUB", then the method can involve moving to track both input operand varnodes (Step 305). If the P-code instruction (Step 312) is "MULTIEQUAL, other instructions", then the method can involve moving to track all input operand varnodes (Step 306).

The method can involve adding all tracked P-code varnodes (e.g., variables) into the data flow (Step 306). Continue back to Step 310.

Figure 4:
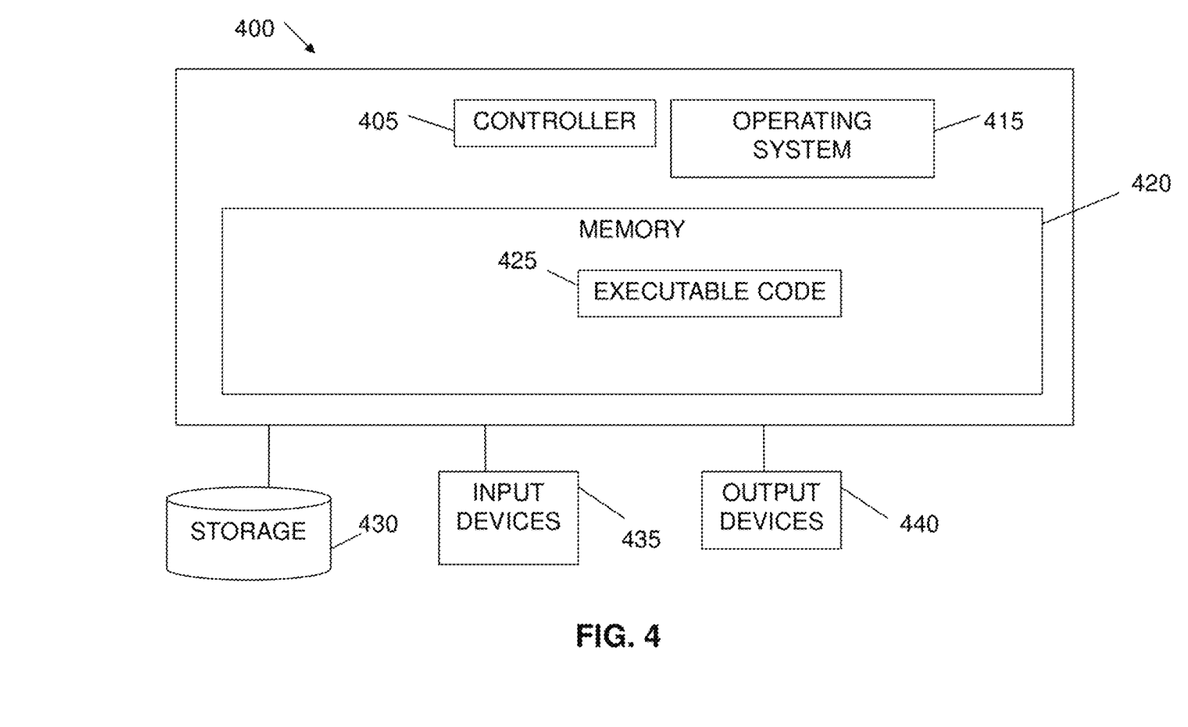
FIG. 4 shows a block diagram of a computing device which can be used with embodiments of the invention.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:
1. A method for detecting malware in portable executable (PE) files, the method comprising:
    receiving, by a server, a PE file;
    decompiling, by the server, the PE file into p-code;
    extracting, by the server, one or more predetermined variables from the p-code, wherein the one or more predetermined variables are potentially malicious;
    obtaining, by the server, a p-code varnode of each of the one or more predetermined variables;

tracking, by the server, the one or more predetermined variables backward to its respective source by:
  i) for a p-code varnode that is not a constant value, determining which next p-code varnode to consider next based on an instruction type of the p-code varnode to track backward to arrive at a constant, and
  ii) for a p-code varnode that is a constant, extracting the constant values;
determining, by the server, whether the constant values indicate the PE file as malware; and
preventing, by the server, the PE file from being executed.

2. The method of claim 1 further comprising locating one or more API calls in the decompiled PE file, and wherein extracting the one or more predetermined variables is based on an API definition database.

3. The method of claim 1 wherein tracking the one or more predetermined variables backward further comprises creating a data flow of all points reached during the backward tracking.

4. The method of claim 1 further comprising parsing, by the server, the PE file to filter known malware.

5. The method of claim 1 wherein determining which next p-code varnode to consider next based on an instruction type of the p-code varnode to track backward to arrive at a constant further comprises:
  for a p-code varnode having instruction type "INDIRECT" setting the next p-code varnode to consider is the second of two input operand varnodes.

6. The method of claim 1 wherein determining which next p-code varnode to consider next based on an instruction type of the p-code varnode to track backward to arrive at a constant further comprises:
  for a p-code varnode having instruction type "INT_NEGATE", "INT_ZEXT", "INTSEXT", or "CAST, COPY" setting the next p-code varnode to consider as the only input operand varnodes.

7. The method of claim 1 wherein determining which next p-code varnode to consider next based on an instruction type of the p-code varnode to track backward to arrive at a constant further comprises:
  for a p-code varnode having instruction type "INT_ADD", "INT_SUB", "INT_MULT", "INT_DIV", "INT_AND", "INT_OR", "INT_XOR", or "PIECE, PTRSUB" setting the next p-code varnode to consider as two input operand varnodes.

8. The method of claim 1 wherein determining which next p-code varnode to consider next based on an instruction type of the p-code varnode to track backward to arrive at a constant further comprises:
  for a p-code varnode having instruction type "MULTIEQUAL" setting the next p-code varnode to consider as all input operand varnodes.

9. One or more non-transitory computer-readable storage media comprising instructions that are executable to cause one or more processors to:
  receive a PE file;
  decompile the PE file into p-code;
  extract one or more predetermined variables from the p-code, wherein the one or more predetermined variables are potentially malicious;
  obtaining a p-code varnode of each of the one or more predetermined variables;
  track the one or more predetermined variables backward to its respective source by:
    i) for a p-code varnode that is not a constant value, determine which next p-code varnode to consider next based on an instruction type of the p-code varnode to track backward to arrive at a constant, and
    ii) for a p-code varnode that is a constant, extract the constant values;
  extract constant values found in the one or more predetermined variables;
  determine, whether the constant values indicate the PE file as malware; and
  prevent the PE file from being executed.

10. The one or more non-transitory computer-readable storage media of claim 9 wherein the one or more processors is further configured to:
  locate one or more API calls in the decompiled PE file, and wherein extracting the one or more predetermined variables is based on an API definition database.

11. The one or more non-transitory computer-readable storage media of claim 9 wherein the tracking further causes the one or more processors to create a data flow of all points reached during the backward tracking.

12. The one or more non-transitory computer-readable storage media of claim 9 wherein the one or more processors is further configured to parse the PE file to filter known malware.

* * * * *